Aug. 5, 1969 W. H. KUMMER 3,459,987
TRAVELING WAVE PHASE SHIFTER HAVING INDEPENDENT GAIN AND PHASE CONTROL
Filed Sept. 15, 1967
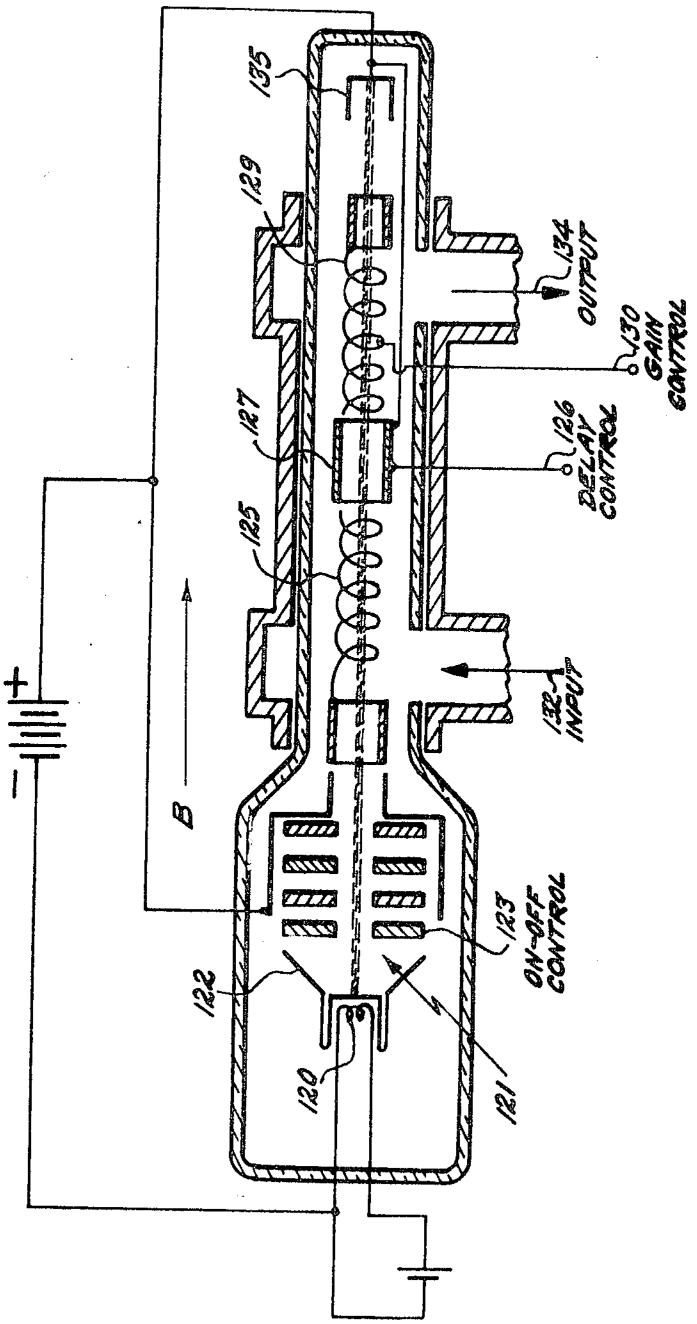
INVENTOR.
WOLFGANG H. KUMMER
BY Harry A. Herbert Jr
Julian L. Siegel
ATTORNEYS

United States Patent Office 3,459,987
Patented Aug. 5, 1969

3,459,987

TRAVELING WAVE PHASE SHIFTER HAVING INDEPENDENT GAIN AND PHASE CONTROL

Wolfgang H. Kummer, Santa Monica, Calif., assignor to the United States of America as represented by the Secretary of the Air Force Filed Sept. 15, 1967, Ser. No. 668,250
Int. Cl. H01j *25/34*
U.S. Cl. 315—3.6 1 Claim

ABSTRACT OF THE DISCLOSURE

A traveling wave tube having an input and an output helix with a drift tube interposed therebetween. Potentials are applied to the output helix and the drift tube for simultaneously and independently varying the gain and the output phase, respectively.

This invention relates to a traveling wave tube and more particularly to traveling wave tubes having independent phase and gain controls.

The invention utilizes a specially developed traveling wave phase shifter tube which contains one additional electrode over the conventional traveling wave tube amplifier and is capable of simultaneous, but independent gain and delay control.

It is an object to provide a traveling wave phase shifter directional finding system in which the delay and gain of the traveling wave phase shifter tube are simultaneously varied.

These and other advantages, features and objects of the invention will become more apparent from the following description taken in connection with the illustrative embodiments in the accompanying drawings, wherein:

The figure is a schematic diagram of the traveling wave phase shifter utilized in this invention.

A special traveling wave tube amplifier is used in this invention which provides both time delay control and gain control. The basic structure of this device is shown in the figure. It comprises low noise gun 121 which includes grid 123 that serves as an off-on control. Electrons are emitted at cathode 122, heated by filament 120, and are collected at collector 135. Drift tube 127 is used as the time delay control which serves as a phase shifter and is controlled at delay control 126. The control of gain is obtained by the voltage on output helix 129 which is controlled at gain control 130. This method of control results in a minimum amount of noise figure degradation and a minimum amount of degradation of saturated output power. The input signal is applied at 132 to input helix 125 and the output is taken at 134 from output helix 129 which is shown using waveguides; however, direct coupling can also be used. The time delay variation is obtained principally by increase of drift tube voltage above its minimum value of approximately 1,000 volts.

Although the invention has been described with reference to a particular embodiment, it will be understood to those skilled in the art that the invention is capable of a variety of alternative embodiments within the spirit and scope of the appended claim.

I claim:

1. A traveling wave phase shifting tube comprising:
(a) an electron gun including a control grid for activating said electron gun;
(b) an input helix adjacent to and in alignment with the electron gun;
(c) R-F input means fed to the input helix;
(d) an output helix in alignment with the input helix;
(e) R-F output means for receiving energy from the output helix;
(f) a drift tube interposed between the input helix and the output helix;
(g) means for applying a potential to the output helix for varying the gain of the tube;
(h) and means for applying a potential to the drift tube for varying the output phase while simultaneously and independently varying the gain.

References Cited

UNITED STATES PATENTS

| | | | |
|---|---|---|---|
| 2,794,936 | 6/1957 | Huber | 315—3.6 |
| 3,179,838 | 4/1965 | Adler | 315—3 |
| 3,314,016 | 4/1967 | Payne | 328—233 |
| 3,337,765 | 8/1967 | Chapell | 315—3.6 |
| 3,341,733 | 9/1967 | Kantorowicz | 315—3.6 |

HERMAN K. SAALBACH, Primary Examiner

S. CHATMON, Jr., Assistant Examiner

U.S. Cl. X.R.

315—39